(12) United States Patent
Pyre

(10) Patent No.: US 11,821,388 B2
(45) Date of Patent: Nov. 21, 2023

(54) THERMAL PROTECTION DEVICE FOR A NOZZLE

(71) Applicant: ARIANEGROUP SAS, Les Mureaux (FR)

(72) Inventor: Alain Pyre, Vernon (FR)

(73) Assignee: ARIANEGROUP SAS, Les Mureaux (FR)

( * ) Notice: Subject to any disclaimer, the term of this patent is extended or adjusted under 35 U.S.C. 154(b) by 0 days.

(21) Appl. No.: 17/755,552

(22) PCT Filed: Nov. 2, 2020

(86) PCT No.: PCT/FR2020/051977
§ 371 (c)(1),
(2) Date: May 2, 2022

(87) PCT Pub. No.: WO2021/089935
PCT Pub. Date: May 14, 2021

(65) Prior Publication Data
US 2022/0381202 A1     Dec. 1, 2022

(30) Foreign Application Priority Data

Nov. 4, 2019 (FR) ..................................... 1912335

(51) Int. Cl.
*F02K 9/97* (2006.01)

(52) U.S. Cl.
CPC ............... *F02K 9/97* (2013.01); *F02K 9/974* (2013.01)

(58) Field of Classification Search
CPC ... F02K 9/40; F02K 9/64; F02K 9/972; F02K 9/974; F02K 9/97
See application file for complete search history.

(56) References Cited

U.S. PATENT DOCUMENTS

| | | | | |
|---|---|---|---|---|
| 3,126,702 A | * | 3/1964 | Newcomb | F02K 9/62 60/260 |
| 3,508,404 A | * | 4/1970 | Gavrun | F02K 9/972 60/770 |
| 4,426,038 A | * | 1/1984 | Inman | F02K 9/974 239/DIG. 19 |

FOREIGN PATENT DOCUMENTS

| | | |
|---|---|---|
| DE | 3686220 T2 | 2/1993 |
| FR | 3060062 A1 | 6/2018 |

(Continued)

OTHER PUBLICATIONS

Pyre et al.; Espacenet Translation of Foreign Reference FR 3060062A1 (Year: 2018).*

(Continued)

*Primary Examiner* — Gerald L Sung
(74) *Attorney, Agent, or Firm* — Bookoff McAndrews, PLLC

(57) ABSTRACT

Nozzle of a spacecraft engine, comprising a nozzle body extending along a main direction, from a proximal end secured to the engine of the spacecraft, and a free distal end, said nozzle body having a plurality of stiffeners extending from an outer surface of the nozzle body, radially with respect to the main direction, said nozzle comprising a thermal insulation system, comprising at least one strip of insulating material disposed so as to surround the outer surface of the nozzle body over at least part of the height of said nozzle body, said thermal insulation system comprising a plurality of holding elements, each holding element being positioned so as to surround said strips of insulating material, and being disposed between two stiffeners of the nozzle body.

8 Claims, 3 Drawing Sheets

(56) References Cited

FOREIGN PATENT DOCUMENTS

FR 3072426 A1 4/2019
FR 3074539 A1 6/2019

OTHER PUBLICATIONS

French Search Report issued in French Application FR 19 12335 dated Jun. 22, 2020 (6 pages).
International Search Report and Written Opinion issued in International Application PCT/FR2020/051977 dated Jan. 27, 2021 with English Translation (10 pages).

* cited by examiner

[Fig. 1]
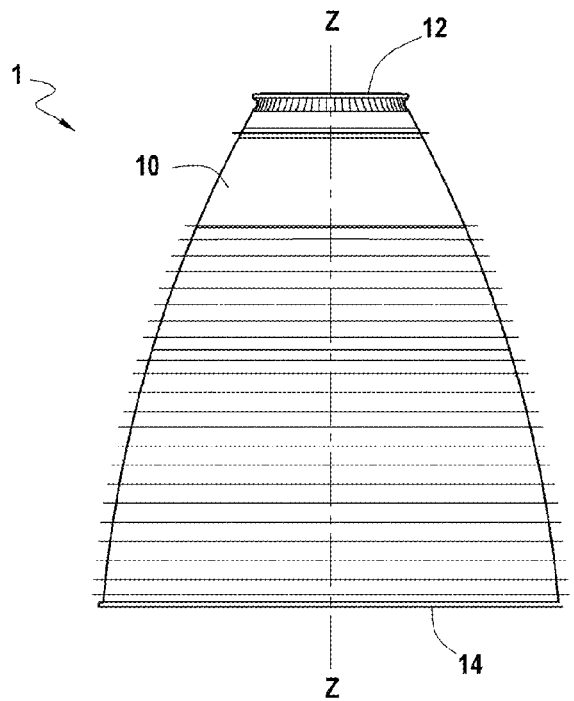
[Fig. 2]
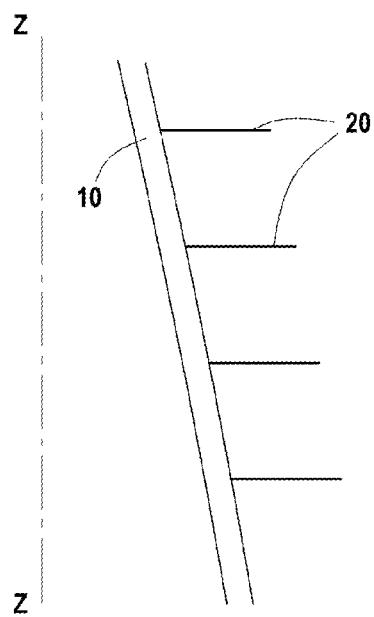

[Fig. 3]
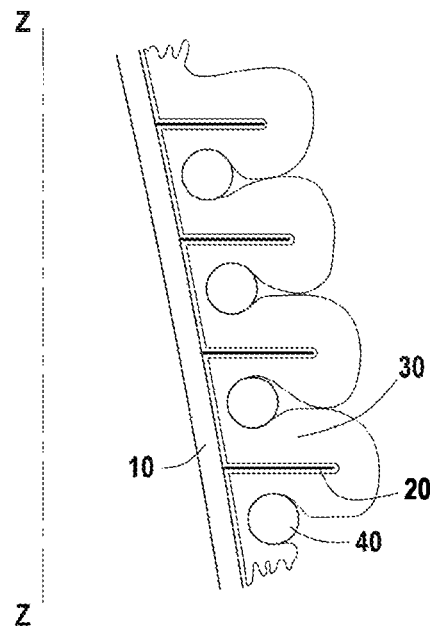
[Fig. 4]
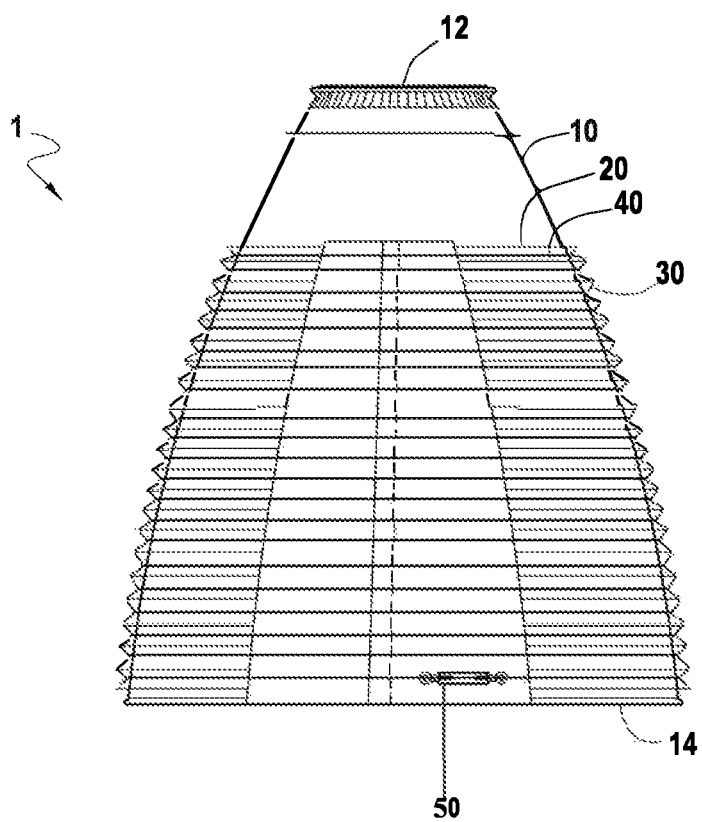

[Fig. 5]
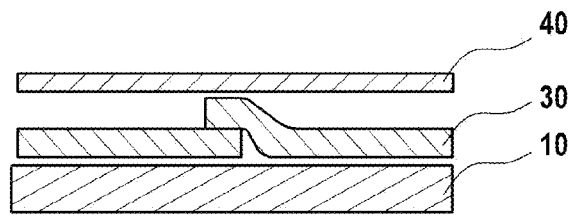
[Fig. 6]
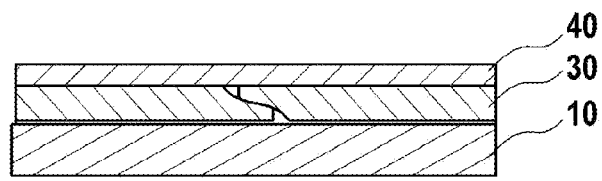
[Fig. 7]
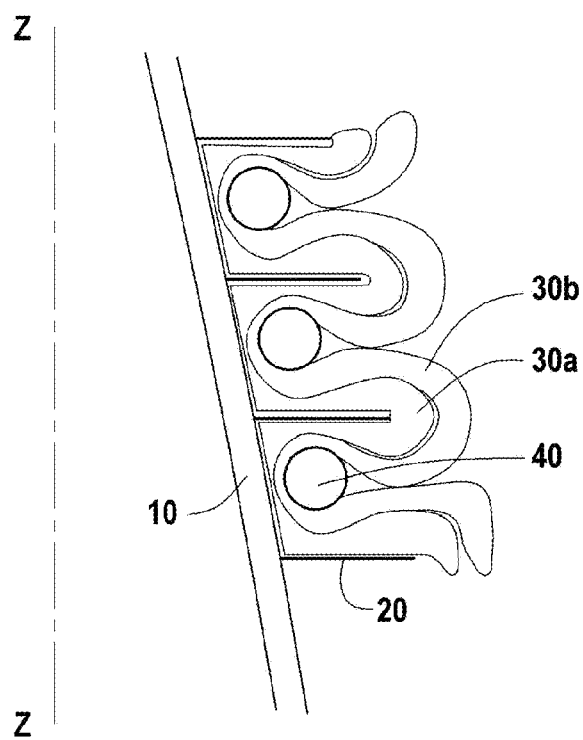

THERMAL PROTECTION DEVICE FOR A NOZZLE

CROSS-REFERENCE TO RELATED APPLICATIONS

This application is a National Stage Application of International Application PCT/FR2020/051977, filed on Nov. 2, 2020, now published as WO 2021/089935 A1, and which claims priority to French patent application FR1912335, filed on Nov. 4, 2019.

TECHNICAL FIELD

The present disclosure relates to the field of space launchers, and more specifically nozzles of space launchers.

PRIOR ART

Space launchers have an engine equipped with a nozzle, commonly called a divergent nozzle, which guides the fluid flow generated by the engine.

The nozzles must therefore withstand both thermal and mechanical stresses. However, the constraints specific to space launchers, particularly in terms of space requirement, mass and cost, make it particularly complex to obtain properties that can respond to these stresses.

Known devices, in particular as presented in documents FR3060062 and FR3074539, propose using rigid insulating blocks which are positioned around the nozzle. Such devices however involve significant constraints for the production of the insulating blocks, which must be produced in order to correspond perfectly to the geometry of the nozzle. The present invention thus aims to propose an insulating structure that does not have such constraints.

DISCLOSURE OF THE INVENTION

In order to address at least partially these problems, the present disclosure relates to a nozzle of a spacecraft engine as defined in claim 1, comprising a nozzle body extending along a main direction, from a proximal end secured to the engine of the spacecraft, and a free distal end, said nozzle body having a plurality of stiffeners extending from an outer surface of the nozzle body, radially with respect to the main direction, said nozzle comprising a thermal insulation system, comprising at least one strip of insulating material disposed so as to surround the outer surface of the nozzle body over at least part of the height of said nozzle body, the height being measured along the main direction, said thermal insulation system comprising a plurality of holding elements, each holding element being positioned so as to surround said strips of insulating material, and being disposed between two stiffeners of the nozzle body.

According to one example, each holding element comprises a cable associated with a tensioning system.

According to one example, each holding element comprises a coating made of thermal insulator.

According to one example, the tensioning system is a turnbuckle.

According to one example, a holding element is disposed in each interval between two stiffeners.

According to one example, the thermal insulation system comprises at least two superimposed strips of insulating material.

According to one example, the thermal insulation system comprises a plurality of strips of insulating material, each strip of insulating material being positioned so as to at least partially cover the adjacent strips of insulating material.

The present disclosure also relates to a spacecraft comprising a nozzle as defined above.

BRIEF DESCRIPTION OF THE DRAWINGS

The invention and its advantages will be better understood upon reading the detailed description given below of different embodiments of the invention given by way of non-limiting examples.

FIG. 1 is an example of a nozzle structure.

FIG. 2 is a detailed view schematizing the disposition of stiffeners of the nozzle.

FIG. 3 represents one example of a thermal insulation system.

FIG. 4 represents one example of a thermal insulation system.

FIG. 5 illustrates the effect of the tensioning of the holding elements of one example of a thermal insulation system, and is a schematic representation of the system before tensioning.

FIG. 6 illustrates the effect of the tensioning of the holding elements of one example of a thermal insulation system, and schematically represents the system after tensioning of the holding elements.

FIG. 7 represents one example of a thermal insulation system.

In all the figures, the elements in common are identified by identical numerical references.

DESCRIPTION OF THE EMBODIMENTS

FIG. 1 represents one example of a nozzle 1 structure.

The nozzle 1 as presented comprises a nozzle body 10 having the general shape of a truncated cone about a main axis Z-Z defining a main direction, with curved walls.

A height of the nozzle 10 is defined along the main axis Z-Z, which extends between a proximal end 12 typically secured to a space launcher engine, and a typically free distal end 14, the designations "proximal" and "distal" being here arbitrary.

The nozzle body 10 is equipped with a plurality of stiffeners 20. Each stiffener 20 is typically a rib extending from an outer face of the nozzle body 10, radially with respect to the main axis Z-Z.

The stiffeners 20 are typically spaced evenly, and extend over all or part of the height of the nozzle 1, typically over a height comprised between 50% and 80% of the height of the nozzle 1, from its distal end 14. FIG. 2 shows one example of a detailed view representing the disposition of the stiffeners 20.

The stiffeners 20 typically have a dimension comprised between 30 and 60 mm measured along a radial direction with respect to the main axis Z-Z.

The stiffeners 20 are typically spaced apart by a distance comprised between 30 and 100 mm measured along the direction defined by the main axis Z-Z.

In order to achieve a thermal insulation of the nozzle 1, a thermal insulation system is disposed around the nozzle body 10, over all or part of its height.

FIGS. 3 and 4 represent one example of a thermal insulation system. Here, a strip of insulating material 30 and a plurality of holding elements 40 have been positioned around a portion of the nozzle body 10 comprising the stiffeners 20.

The strip of insulating material 30 is dimensioned so as to cover at least two successive stiffeners 20. In the example illustrated, two strips of insulating material 30 have been positioned which each extend over the entire height of the nozzle body 10 comprising the stiffeners 20, but covering only part of the circumference of the nozzle body 10.

According to one example, the thermal insulation system comprises one or several strips of insulating material 30 forming panels which are positioned end to end or so as to overlap at their junction so as to cover all of the stiffeners 20. Each strip of insulating material 30 typically has a sufficient dimension so as to be able to make a complete turn around the nozzle body 10. The two ends of the strip of insulating material 30 then typically overlap over a defined width, typically comprised between 30 and 100 mm so as to ensure a continuity of the thermal protection. As a variant, the strips of insulating material 30 can be dimensioned so as to cover only one portion of the outer periphery of the nozzle body 10. It is thus necessary to position several strips of insulating material 30 in order to cover the entire circumference of the nozzle body 10. The strips of insulating material 30 are then positioned such that their adjacent ends overlap over a defined width, typically comprised between 30 and 100 mm so as to ensure a continuity of the thermal protection. More generally, the strips of insulating material 30 can overlap along the direction defined by the main axis Z-Z, and/or along the circumference of the nozzle body 10.

The strips of insulating material 30 used to wrap the nozzle body 10 can be identical or distinct, in particular in terms of dimension. For example, the strips of insulating material 30 can be composed of a casing made of alumina fibers, silica and boron oxide, for example fibers of a material marketed under the name "Nextel®" (registered trademark), the casing being filled with an insulating material made of polycrystalline wool, for example a material marketed under the name "Fibermax®" (registered trademark). The strips of insulating material 30 are flexible elements, which can thus be freely positioned around the nozzle body 10, independently of the section of the nozzle and of the arrangement of the stiffeners 20.

Holding elements 40 are then positioned around the nozzle body 10. Each holding element 40 is positioned between two successive stiffeners 20. The holding elements 40 are typically elastic means, means having an elastic or tensioning function, or straps coupled to a tensioning system. According to one example, each holding element 40 comprises a metal cable typically surrounded by a thermal insulator and a tensioning system such as a turnbuckle 50. By way of example, a holding element 40 can be composed of a cable made of steel or a material marketed under the designation "Inconel®" (registered trademark), the cable being typically surrounded by a thermal insulator, for example made of a material marketed under the name "Fibermax®" (registered trademark) surrounded by a casing made of a material marketed under the name "Nextel®" (registered trademark), or made by one or several layers of a material marketed under the name "Nextel®" (registered trademark). The cable can also be made of a material marketed under the name "Fibermax®" (registered trademark), of glass fibers surrounded by a thermal insulator, or of carbon fibers.

The tensioning of each holding element 40 will enclose the strip of insulating material 30 which is thus enclosed between the nozzle body 10 on the one hand and the holding element 40 on the other hand. This tensioning thus houses the holding elements in the intervals between two successive stiffeners 20, as well as the strip of insulating material 30.

The tensioning of the different holding elements 40 thus substantially deforms and conforms the strip of insulating material 30 to the geometry of the nozzle body 10, including the stiffeners 20, and allows obtaining a continuous and stable insulating layer around the nozzle body 10.

According to one example, a holding element 40 is positioned in each interval between two successive stiffeners 20, as represented for example in FIG. 4.

FIGS. 5 and 6 illustrate the effect of the tensioning of the holding elements 40 on a portion covering a strip of insulating material 30. As indicated above, the strips of insulating material 30 disposed around the nozzle body 10 are typically dimensioned such that their ends overlap over a defined width. This is schematically represented in FIG. 5. When the holding element 40 is tensioned, it then compresses the strip of insulating material 30, and particularly the overlapping portions, to obtain a substantially uniform thickness, as schematically represented in FIG. 6.

FIG. 7 represents one exemplary embodiment in which two strips of insulating material 30 are superimposed. They are designated respectively by 30a and 30b to respectively designate the strip of insulating material in contact with the nozzle body 10, and the outermost strip of insulating material.

The tensioning of the holding elements 40 conforms the different strips of insulating material 30a and 30b on the outer surface of the nozzle body 10, including on the stiffeners 20.

In operation, any air present between the divergent nozzle 10 and the insulator 30a and between the different strips of insulating material 30 will typically escape at the portion covering the ends of the strips of insulating material schematically represented in FIGS. 5 and 6.

It is understood that this exemplary embodiment is not limiting, and that any number of strips of insulating material 30 can thus be superimposed in order to obtain the desired properties, the operation remaining unchanged. The use of several superimposed strips of insulating material 30 allows in particular using strips of insulating material 30 having distinct properties, in particular in terms of thickness and thermal and/or mechanical properties.

The proposed thermal insulation system is advantageous in particular for the following reasons.

It has good resistance to the blast wave resulting from the ignition of the auxiliary booster of the spacecraft and also to the vibrations of the nozzle 1. The strips of insulating material 30 indeed rest on their entire surface against the outer wall of the nozzle body 10 which is rigid. It also has good resistance to external depressurization, since the air present between the nozzle body 10 and the strips of insulating material 30 or between the different strips of insulating material 30 can escape at the areas covering the strips of insulating material 30.

The thermal insulation system is also advantageous in terms of installation, since it does not require any structural modifications to the nozzle 1, and only requires the addition of strips of insulating material and a tensioning element. Its mass and cost are also low. In addition, the different elements of the proposed thermal insulation system are not subjected to mechanical stresses during the operation, which ensures the reliability of the thermal insulation system. Furthermore, unlike known devices which use rigid insulating elements, the strips of insulating material 30 do not require specific dimensioning to adapt to the geometry of the nozzle 1. The strips of insulating material 30 are flexible, and can be freely positioned around the nozzle body 10, the conformation to the geometry of the nozzle 1 being ensured during the tightening of the holding elements 40.

Although the present invention has been described with reference to specific exemplary embodiments, it is clear that modifications and changes can be made to these examples without departing from the general scope of the invention as defined by the claims. Particularly, individual characteristics of the different illustrated/mentioned embodiments can be combined in additional embodiments. Accordingly, the description and the drawings should be considered in an illustrative rather than restrictive sense.

It is also clear that all the characteristics described with reference to one method can be transposed, alone or in combination, to one device, and conversely, all the characteristics described with reference to one device can be transposed, alone or in combination, to one method.

The invention claimed is:

1. A nozzle of a spacecraft engine, comprising a nozzle body extending along a main direction, from a proximal end secured to the spacecraft engine, and a free distal end,
    said nozzle body having a plurality of stiffeners extending from an outer surface of the nozzle body, radially with respect to the main direction,
    said nozzle comprising a thermal insulation system, comprising at least one strip of flexible insulating material disposed so as to surround the outer surface of the nozzle body over at least part of the height of said nozzle body, the height being measured along the main direction, said thermal insulation system comprising a plurality of holding elements, each holding element being disposed between two stiffeners of the plurality of stiffeners of the nozzle body and positioned so as to surround said at least one strip of flexible insulating material and so as to conform the at least one strip of flexible insulating material on the outer surface of the nozzle body and on the plurality of stiffeners.

2. The nozzle according to claim 1, wherein each holding element comprises a cable associated with a tensioning system.

3. The nozzle according to claim 2, wherein each holding element comprises a coating made of thermal insulator.

4. The nozzle according to claim 2, wherein the tensioning system is a turnbuckle.

5. The nozzle according to claim 1, wherein two adjacent stiffeners from the plurality of stiffeners define an interval, and wherein a holding element from the plurality of holding elements is disposed in each interval between two adjacent stiffeners from the plurality of stiffeners.

6. The nozzle according to claim 1, wherein the at least one strip of flexible insulating material of the thermal insulation system comprises two superimposed strips of insulating material.

7. The nozzle according to claim 1, wherein the at least one strip of flexible insulating material of the thermal insulation system comprises a plurality of strips of insulating material, each strip of the plurality of strips of insulating material being positioned so as to at least partially cover an adjacent strip of insulating material.

8. A spacecraft comprising the nozzle according to claim 1.

* * * * *